(12) United States Patent
Vizier et al.

(10) Patent No.: US 11,679,799 B2
(45) Date of Patent: Jun. 20, 2023

(54) METHOD FOR USING ULTRASOUND TO LOCK A PLASTIC PLUG THAT PLUGS A STEERING BOX

(71) Applicant: JTEKT EUROPE, Irigny (FR)

(72) Inventors: Pascal Vizier, St Genis Laval (FR); Bruno Goujon, Feyzin (FR)

(73) Assignee: JTEKT EUROPE, Irigny (FR)

( * ) Notice: Subject to any disclaimer, the term of this patent is extended or adjusted under 35 U.S.C. 154(b) by 740 days.

(21) Appl. No.: 16/606,876

(22) PCT Filed: May 4, 2018

(86) PCT No.: PCT/FR2018/051132
§ 371 (c)(1),
(2) Date: Nov. 8, 2019

(87) PCT Pub. No.: WO2018/211198
PCT Pub. Date: Nov. 22, 2018

(65) Prior Publication Data
US 2020/0130724 A1 Apr. 30, 2020

(30) Foreign Application Priority Data
May 18, 2017 (FR) .................................. 1754406

(51) Int. Cl.
*B62D 3/12* (2006.01)
*B29C 65/56* (2006.01)
(Continued)

(52) U.S. Cl.
CPC .............. *B62D 3/12* (2013.01); *B29C 65/561* (2013.01); *B29C 65/606* (2013.01);
(Continued)

(58) Field of Classification Search
None
See application file for complete search history.

(56) References Cited

U.S. PATENT DOCUMENTS

| | | |
|---|---|---|
| 2003/0115980 A1 | 6/2003 | Sickert et al. |
| 2014/0251035 A1 | 9/2014 | Ricker |

FOREIGN PATENT DOCUMENTS

| | | |
|---|---|---|
| DE | 10 2009 019 189 A1 | 11/2010 |
| DE | 10 2010 000 866 A1 | 7/2011 |

(Continued)

OTHER PUBLICATIONS

Machine English translation of JPH0691756A, Accessed Aug. 22, 2022 (Year: 1994).*

(Continued)

*Primary Examiner* — Jacob T Minskey
*Assistant Examiner* — Adrianna N Konves
(74) *Attorney, Agent, or Firm* — Oliff PLC (57) ABSTRACT

A method includes a rotation locking step during which the rotation of the threaded hub about the central axis is blocked by heating a portion of the plug to soften, then by forcing the softened thermoplastic material to penetrate into, and then solidify in, a female cavity hollowed in the wall of the orifice to constitute a male member which fits into the female cavity. The female cavity forms, against the action of the male member, a guiding end stop preventing the male member, and therefore the hub, from rotating about the central axis to oppose any rotary screwing/unscrewing of the plug and maintaining a degree of freedom in axial translation along the central axis of the male member within the female cavity, so as not to impede a sliding of the hub and of its screw thread along the central axis against the wall.

10 Claims, 4 Drawing Sheets

(51) Int. Cl.
    *B29C 65/60*     (2006.01)
    *B29C 65/64*     (2006.01)
    *B29C 65/72*     (2006.01)
    *B29C 65/00*     (2006.01)
    B29K 59/00     (2006.01)
    B29K 77/00     (2006.01)
    B29K 309/08     (2006.01)
    B29L 31/30     (2006.01)

(52) U.S. Cl.
    CPC ............ *B29C 65/645* (2013.01); *B29C 65/72* (2013.01); *B29C 66/742* (2013.01); *B29K 2059/00* (2013.01); *B29K 2077/00* (2013.01); *B29K 2077/10* (2013.01); *B29K 2309/08* (2013.01); *B29L 2031/30* (2013.01)

(56) References Cited

FOREIGN PATENT DOCUMENTS

| | | | |
|---|---|---|---|
| EP | 0269476 A1 | * | 6/1988 |
| EP | 0 572 153 A2 | | 12/1993 |
| GN | 1836887 A | | 9/2006 |
| JP | H06-091756 A | | 4/1994 |
| KR | 10-2009-0116183 A | | 11/2009 |

OTHER PUBLICATIONS

Machine English translation of EP0269476A1, Accessed Aug. 22, 2022 (Year: 1988).*
Aug. 13, 2018 Search Report issued in International Patent Application No. PCT/FR2018/051132.

* cited by examiner

METHOD FOR USING ULTRASOUND TO LOCK A PLASTIC PLUG THAT PLUGS A STEERING BOX

The present invention concerns plugging methods allowing closing an orifice pierced in a casing, such as a steering casing, by means of a plug made of a plastic material.

It is known to equip the vehicles with power steering systems which generally comprise a rack, slidably mounted in a steering casing, and on which is meshed at least one pinion which may be driven by a steering wheel and/or by an assist motor.

In order to reduce the meshing clearances between the rack and the pinion, it is known to press the rack against the pinion, transversely to the longitudinal axis of translation of said rack, by means of a spring-biased tappet.

Said tappet may comprise, in a manner known per se, a pad which slidably bears at the back of said rack, diametrically opposite to the toothing of the rack which meshes on the pinion, said pad being biased in the direction of the rack and the pinion by a spring-type elastic member.

The pad and the spring are mounted and guided in a jacket, generally metallic, which forms a portion of the steering casing, and which is plugged by a plug.

The plug ensures a tight closure of the casing, and serves as a support to the spring.

One difficulty encountered during the assembly relates to the fact that said plug must be accurately positioned in the orifice of the steering casing, in an accurate position called «calibration position», which on the one hand leaves between the pad and the plug a functional clearance that is just necessary and sufficient to enable said pad to accommodate the radial displacement of the rack, and which on the other hand guarantees a calibrated setting of the default degree of compression of said spring, and consequently a setting of the magnitude of the biasing force that said spring exerts against the pad and the rack.

Furthermore, the plug must be locked in the casing in a sufficiently solid manner so as not to be displaced or detached under the effect of shocks, vibrations or thermal variations undergone by the casing throughout the service life of the vehicle.

That is the reason why it is known in particular to provide the plug with a thread, which allows screwing said plug into the jacket of the casing. The locking of the plug in rotation may then be performed by gluing, by providing glue between the thread and the casing.

Such a solution is generally satisfactory, but nonetheless has some drawbacks.

Indeed, consideration should be given at first to the polymerization time (drying time) of the glue.

This drying time must be sufficiently long to authorize the set-up of the plug in the casing, and then the subsequent adjustment of the screwing of the plug, before ultimate curing of the glue, in order to enable the accurate setting of the calibration position of the plug in the casing, and therefore the setting of the functional clearance of the tappet.

Hence, it is not possible to immediately check, on the industrial line for setting up the plug, the quality of the fastening of the plug on the casing, since the glue has not yet cured at this point.

Moreover, once the plug is glued, it is almost impossible to dismount said plug without causing irreversible damages to said plug, or even to the casing itself, such that it is no longer possible to subsequently rectify the calibration of the spring.

Alternatively, there are crimping methods during which, after having screwed the plug, a forced plastic deformation of the casing is carried out so as to ovalize the jacket in order to block the plug therein.

According to such methods, the calibration position of the plug is then generally set by forcing a posteriori a screwing or unscrewing of the plug, against the ovalized casing.

Of course, such methods are, herein again, likely to damage the plug, and even damage the casing, or disrupt the functional clearance between the pad and the plug.

Consequently, the objects assigned to the invention aim at proposing a new method for plugging a casing which allows assembling rapidly, at a lower cost, and in a compact and accurate manner, a plug on a casing, in particular a plug made of a plastic material on a metallic casing.

The objects assigned to the invention are achieved by means of a plugging method allowing plugging an orifice with a central axis (XX') pierced in a wall, such as a casing wall, by means of a plug having a threaded hub provided with at least one thread, said method comprising a screwing step (a) during which the threaded hub of the plug is screwed into the orifice by fitting the thread of said hub against the wall, then a rotational locking step (b), during which the rotation of the threaded hub about the central axis (XX') is blocked in order to resist the screwing and unscrewing of the plug, said method being characterized in that, at said rotational locking step (b), a portion of the plug made of a thermoplastic material is heated up so as to soften said thermoplastic material, the softened thermoplastic material is forced to penetrate, and then to solidify, into a female cavity drilled in the wall of the orifice in order to constitute a male member which nests into said female cavity, the female cavity being arranged such that it forms against the male member a guide stop which, on the one hand, prevents the rotation of the male member, and therefore of the hub, about the central axis (XX'), so as to resist a screwing or unscrewing rotational movement of the plug, but which on the other hand keeps a degree of freedom in axial translation, along said central axis (XX'), of said male member within said female cavity, so as not to hinder a sliding of the hub and of its thread along the central axis (XX'), against the wall.

Advantageously, the invention allows combining a fastening by screwing, which ensures a first axial retaining function of the plug, with a fastening by thermoplastic deformation which ensures a second rotational blocking function of the plug.

The dissociation of these functions, each accomplished by distinct members, advantageously allows avoiding a negative interference between these two functions. Thus, in particular, the rotational locking, although it completes the screwing to resist the extraction of the plug by unscrewing, does not resist, however, a slight axial adjustment of said plug, in axial translation, which allows in particular keeping, or recovering after the locking step, a fine setting of the functional clearances of the plug with respect to one or several mechanical member(s) contained in the casing.

Other objects, features and advantages of the invention will appear in more detail on reading the following description, as well as using the appended drawings, provided for a purely illustrative and non-limiting purpose, among which.

The invention concerns a plugging method allowing plugging an orifice 1 with a central axis (XX') pierced in a wall 2, such as a casing 3 wall 2, by means of a plug 4 having a threaded hub 5 provided with at least one thread 5T.

Preferably, the wall 2 is made of a metallic material, for example an aluminum alloy.

Alternatively, the wall 2 of the casing 3 may be made of a rigid plastic material.

In such case, the plastic material constitutive of the wall 2 of the casing 3 will be different from the constitutive material of the plug 4, in particular in order to avoid any accidental welding of the plug 4 to the wall of the casing, in particular during the heat-up.

Figure 6:
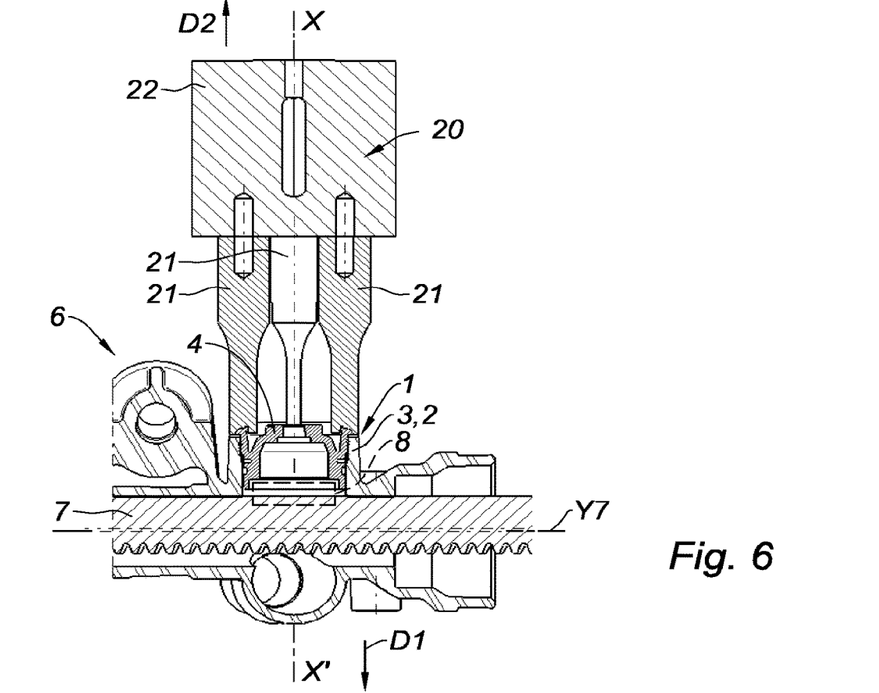
FIG. 6 illustrates, according to a longitudinal sectional view, the implementation of the tool of FIG. 4 on a plug according to FIGS. 1 to 3 to lock in rotation said plug within a steering casing.
Figure 8:
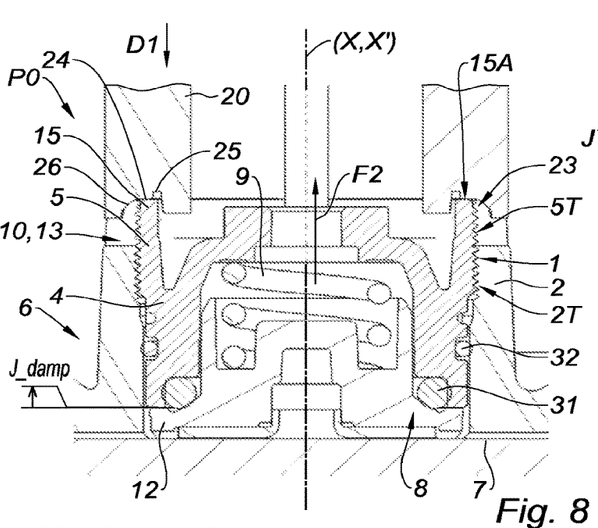
FIG. 8 illustrates, according to a longitudinal sectional view, an initial first phase of a rotational locking step (b) according to the invention when the tool of FIG. 4 approaches contact with the crown of the plug of FIGS. 1 to 3.
Figure 16:
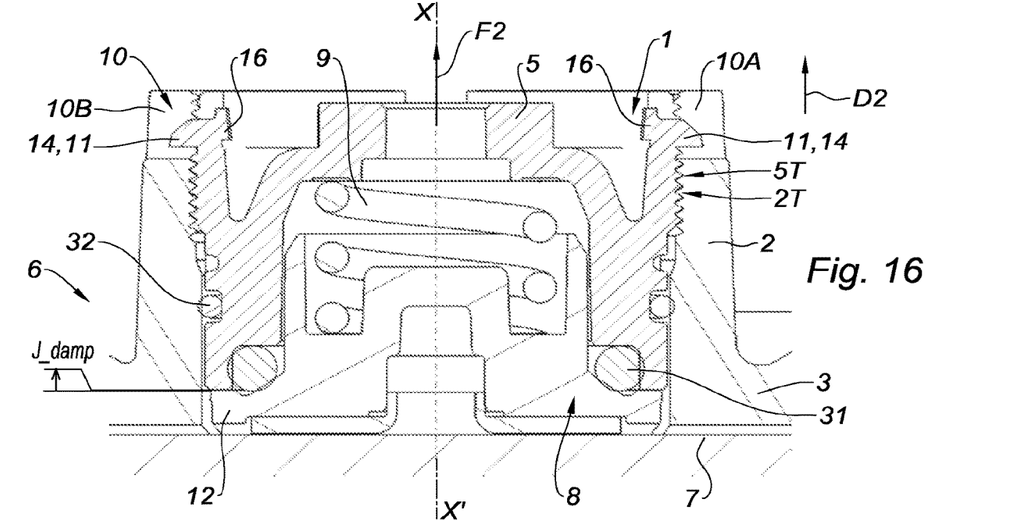
FIG. 16 illustrates, according to a longitudinal sectional view, the plug locked in rotation in the casing, after removal of the tool.
Figure 17:
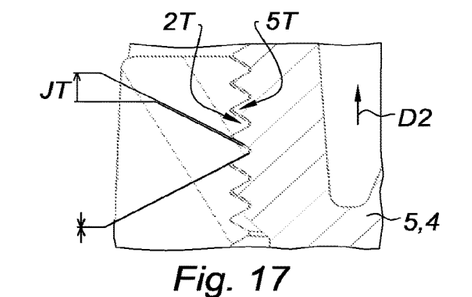
FIG. 17 is a detail view of FIG. 16 showing the axial return of the plug, bearing at the rear against the wall, under the effect of an elastic member of a steering tappet.

Preferably, the casing 3 is a steering casing, used to protect mechanical members of a power steering system 6, including in particular a rack 7, as illustrated in particular in FIGS. 6, 8 and 16.

More particularly, the casing 3 may form the jacket of a tappet 8, and more particularly of a tappet 8 with a spring 9 for example with a helical spring 9, which is intended to push, by means of a pad 12 biased by the spring 9, the rack 7 against a drive pinion, in order to reduce the clearances and the meshing noises. Amongst others, such a tappet 8 will allow compensating for the effects of wear.

It should be noted that an elastomer damper member 31, such as a damper O-ring gasket 31, may be provided, in addition to the spring 9, between the pad 12 and the plug 4, to ensure the centering of the pad 12 and contribute to the elastic return of said pad 12 against the rack 7.

The orifice 1, with a circular section, will then be designed to enable the introduction of the tappet 8 into the casing 3, and the set-up of said tappet against the back of the rack, opposite to the toothing of the latter.

The plug 4, and more particularly the solid hub 5, will serve to plug the casing 3, so as to isolate the interior of the casing 3, containing the tappet mechanism 8, from the exterior environment of the casing 3.

In order to ensure a plugging that is tight at least to liquid water as well as to the lubricant, so as to prevent water from penetrating into the casing 3 via the orifice and to retain the lubricant, typically grease, inside the casing 3, the plug 4 will preferably comprise a sealing gasket 32, such as an O-ring gasket, preferably interposed between the hub 5 and the inner surface of the wall of the orifice 1.

For convenience of the description, the central axis (XX') of the orifice 1 will be assimilated to the central axis (axis of revolution) of the plug 4 and to the push axis of the tappet, substantially perpendicular to the axis Y7 of translation of the rack 7.

Similarly, by «axial», it should be understood a direction parallel or coincident with the central axis (XX'), and by «radial» a direction perpendicular to said central axis (XX').

The method comprises a screwing step (a) during which the threaded hub 5 of the plug 44 is screwed into the orifice 1 by engaging the thread 5T of said hub against the wall 2, and more particularly against a matching thread 2T of said wall.

This screwing allows making the plug 4 to penetrate axially into the orifice, preferably in a flush manner, that is to say not projecting axially, with respect to the apparent surface of the wall 2 which is visible and accessible from the outside, and axially retaining the plug 4 to prevent the extraction thereof according to the central axis (XX').

Afterwards, the method comprises a rotational locking step (b), during which the rotation of the threaded hub 5 about the central axis (XX') is blocked in order to resist the screwing and unscrewing of the plug 4.

To this end, at said rotational locking step (b), and as illustrated in FIGS. 6, 11, 12, 13, a portion of the plug 4 made of a thermoplastic material is heated up, and more particularly a portion made of a thermoplastic material secured to the hub 5 or integral with said hub is heated up, so as to soften said thermoplastic material, and the softened thermoplastic material is forced to penetrate (FIGS. 11 to 13, FIG. 19), and then to solidify (FIG. 6, FIG. 16, FIG. 19), into a female cavity 10 drilled in the wall 2 of the orifice 1 in order to constitute a male member 11 which nests into said female cavity 10.

Preferably, the hub 5, and more generally the plug 4, is integrally made, preferably in one-piece, of a thermoplastic material.

In particular, this allows lightening the plug, manufacturing it by molding by means of a mold with a simple shape, and locally remodeling it to form the male member(s) 11.

According to the invention, the female cavity 10 is arranged such that it forms against the male member 11 a guide stop which, on the one hand, prevents the rotation of the male member 11, and therefore of the hub 5, about the central axis (XX'), so as to resist to a screwing or unscrewing rotational movement of the plug 4, but which, on the other hand, keeps a degree of freedom in axial translation, along said central axis (XX'), pf said male member 11 within said female cavity 10, so as not to hinder a sliding of the hub 5 and of its thread 5T along the central axis (XX'), against the wall 2, and more particularly against the matching thread 2T of said wall 2.

The rotational blocking imparted by the male member 11 against the female cavity 10 is bidirectional, in order to resist screwing as well as unscrewing of the plug 4.

This bidirectional rotational blocking of the plug 4 advantageously complements the screwing to prevent the extraction of the plug 4 out of the orifice 1.

Furthermore, such a rotational blocking allows avoiding, when the power steering system 6 is in operation, any inadvertent modification (due to an undesirable screwing or unscrewing) of the axial position of the plug 4 with respect to the casing 3, and therefore any unsetting of the possible functional clearances that depend on the axial position of said plug 4, such as for example a suspension axial clearance J_damp which will be described hereinbelow.

Advantageously, the female cavity 10 serves as mold to the thermoplastic material to form a male member 11 which has a suitable shape, matching with said female cavity 10.

The shape of said female cavity 10 is selected such that the central axis (XX') corresponds to a demolding direction of the male member 11, that is to say such that the nesting of the male member 11 into the female cavity 10 further authorizes a relative sliding movement of the male member 11, and therefore of the hub of the plug 5 which carries said male member 11, in translation according to the central axis (XX').

Figure 9:
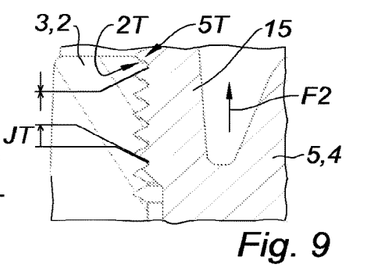
FIGS. 9 and 10 are detail views of FIG. 8 allowing visualizing the axial clearances initially present, before screwing the plug and after application of the insertion stress by the forming tool.

Thus, the plug 4 will be able to keep some degree of freedom in axial translation, at least within the limits authorized by the thread axial clearance JT provided between the thread 5T of the hub and the matching thread 2T of the wall (FIG. 9).

Of course, the thermoplastic material of the plug 4 and the material, preferably metallic, of the wall 2 will be selected so as not to stick to each other, including following the softening and the solidification of the thermoplastic material in contact with the female cavity 10.

For indication, it is possible to use as a thermoplastic material, within the plug 4, poly-oxy-methylene (POM), polyamide (PA), polyphthalamide (PPA), possibly charged with reinforcing fibers, for example glass fibers.

By «insertion direction» D1, it should be understood the direction in which the plug 4 penetrates into the orifice 1 and is inserted inside the casing 3, in particular during the screwing, and by «extraction direction» D2, it should be understood the opposite direction, oriented from the inside towards the outside of the casing 3.

Preferably, at the screwing step (a), the threaded hub is threaded into the orifice in a direction called «penetration direction» D1, against an elastic member 9, 31, such as preferably the spring 9 of the aforementioned tappet 8, preferably completed with a damper O-ring gasket 31 as indicated hereinabove.

Said elastic member 9, 31 exerts on said hub 5 a biasing force F2 oriented in an opposite direction, called «extraction direction» D2.

In operation, the elastic member 9, 31 and its biasing force F2 allow maintaining a suspension axial clearance J_damp (illustrated in particular in FIGS. 8 and 10) between the plug 4, which forms the fixed liner of the tappet 8, and the elastically suspended pad 12, which presses the back of the rack 7. Thus, the rack 7 can accommodate possible meshing clearances by slight transverse movements, within the limit of the suspension clearance J_damp.

More particularly, the elastic member 9, 31 therefore tends to urge the thread of the hub 5T so as to bear at the rear against the wall 2, as illustrated in particular in FIG. 9, that is to say tends to urge the trailing edge of the hub thread 5T, herein the upper edges in FIG. 9, oriented towards the outside of the casing, against the leading edges of the matching thread of the wall 2T, herein the lower edges, oriented towards the inside of the casing 3.

Figure 10:
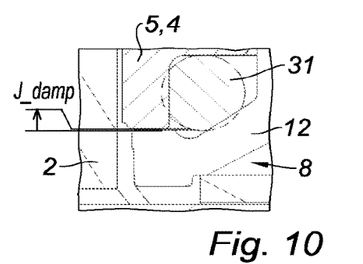

At the screwing step (a), the screwing is continued until the hub 5 reaches a desired axial position, called «calibration position» P0, corresponding to FIGS. 8, 9 and 10, in which the thread of the hub 5T is pressed so as to bear at the rear against the wall 2T by the elastic member 9, 31.

This calibration position P0 corresponds to a setting position, that is to say to an axial positioning of the plug 4 with respect to the tappet 8 and to the rack 7, which imparts a degree of compression of the spring 9, and more generally a degree of compression of the elastic member 9, 31, which is such that the axial clearance corresponds to a desired nominal suspension clearance J_damp, preferably comprised between 50 μm and 100 μm, and for example equal to 60 μm, and that the biasing force F2 corresponds to a selected nominal biasing force, for example comprised between 500 and 1000 N, and preferably close to 600 N.

According to the invention, at the rotational locking step (b), a forming tool 20 which exerts an insertion force F1 in the penetration direction D1, is then applied on the plug 4, to soften and push the thermoplastic material in the female cavity 10, as illustrated in FIGS. 6, 8, 11 to 13 and 19.

Figure 15:
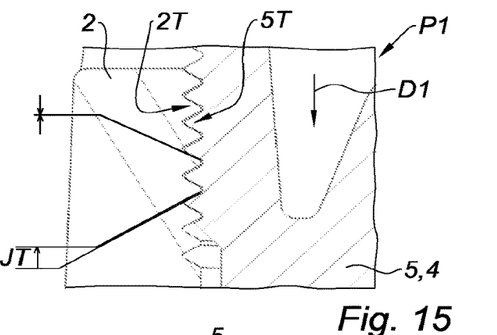

Thus, said insertion force F1 tends to peel off the thread of the hub 5T from its back bearing, and to displace the plug 4 in the penetration direction D1 relative to the calibration position P0, as shown in FIG. 15.

Preferably, during the step of thermoplastic deformation the plug 4 and of formation of the male member(s) 11, the insertion force F1 required for the proper formation of the male member(s) may exceed the nominal biasing force F2, for example by reaching a value in the range of 650 N.

In such case, the insertion force F1 compresses the spring 9, and more generally the elastic member 9, 31, against the pad 12 and the rack 7, thereby temporarily conferring to the plug 4 a deeper position P1 than the calibration position P0.

Figure 14:
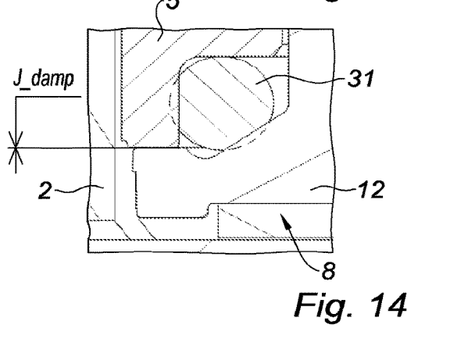
FIGS. 14 and 15 are detail views corresponding to FIGS. 10 and 9 respectively, and which show the axial clearances resulting from the axial transfer of the thread of the plug against the wall of the orifice during the application of the insertion stress by the tool.

By doing so, the dampening axial clearance J_damp between the pad 12 and the plug 4 is temporarily reduced, and it may even be possible to bring the plug 4 in contact with the pad 12, that is to say temporarily reduce to zero said dampening clearance J_damp, as illustrated in FIG. 14.

Where appropriate, the insertion force F1 may bring the thread of the hub 5T so as to bear at the front against the matching thread 2T of the wall, that is to say to press the leading edges of the hub thread 5T, herein the lower edges in FIG. 15, against the trailing edges of the matching wall thread 2T, herein the upper edges.

According to the invention, once the male member(s) 11 are formed, the forming tool 20 is removed so as to release the insertion force F1 and to enable the hub 5 and the male member 11 to perform, under the action of the elastic member 9, 31, a backward movement in the extraction direction D2, until the plug 4 recovers its initial calibration position P0, with the thread of the hub 5T pressed so as to bear at the rear against the wall 2.

Advantageously, the axial mobility authorized by the cooperation between the male member 11 and the female cavity 10, and more particularly the axial guidance in translation ensured by said cooperation, enables the plug 4 to automatically recover its origin, by rearward axial sliding and abutment, after the creation of the rotational locking male member(s) 11.

Thus, the implementation of the rotational locking does not affect the initial setting of the nominal dampening axial clearance J_damp and the magnitude of the nominal biasing force F2 which correspond to the calibration position P0.

Hence, it is possible to finely set the calibration position P0 through an accurate screwing of the plug 4, and afterwards proceed with the rotational locking without any risk of accidently modifying or losing this setting.

Preferably, there is provided in the wall 2 a female cavity 10 formed by at least one notch 13 which opens onto the orifice 1 and which is delimited in azimuth around the central axis (XX') by surfaces, called bearing surfaces 10A, 10B, which are substantially parallel to said central axis (XX').

By «substantially parallel to the central axis (XX')», it is indicated that the bearing surfaces 10A, 10BB have an angle of inclination with the central axis (XX') which is comprised between a zero value, in the case where the bearing surfaces are exactly parallel to said central axis (XX'), and a maximum value equal to or smaller than 5 degrees, or equal to or smaller than 3 degrees, or even equal to or smaller than 2 degrees, and which then corresponds to a draft angle which flares towards the outside of the casing 3.

For convenience, it is possible to assimilate the female cavity 10 and the notch(es) 13 in what follows.

Figure 7:
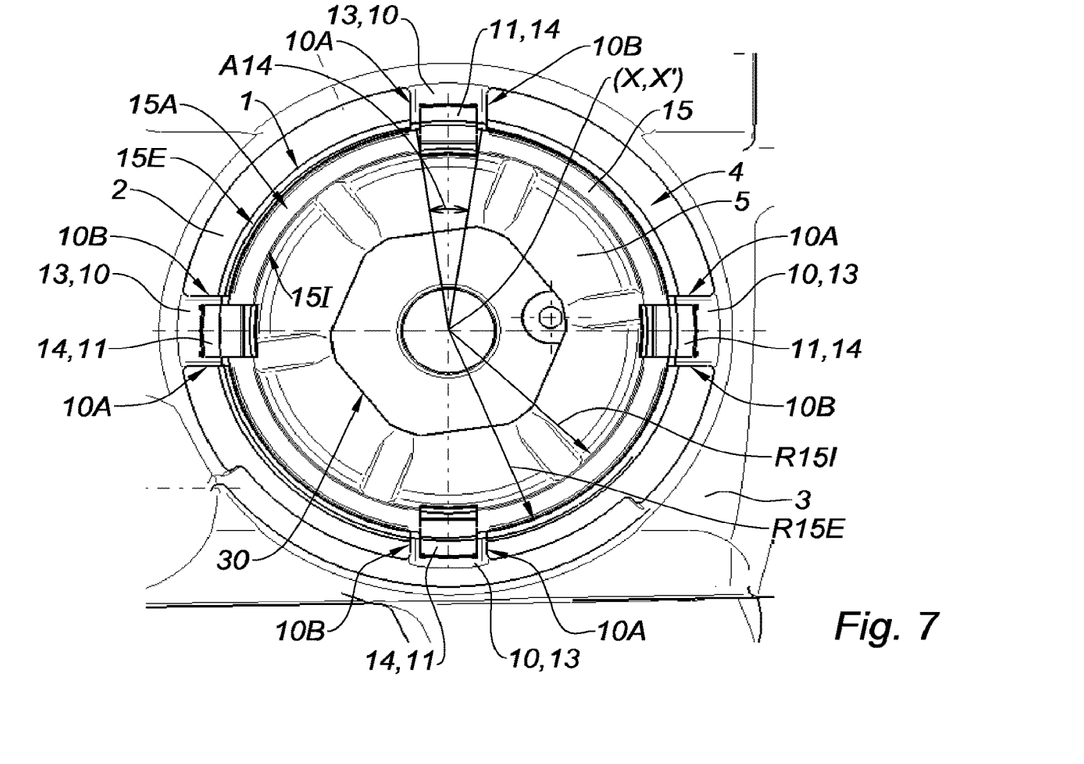
FIG. 7 illustrates, according to a partial top view, the plug locked in the casing, after shaping the radially projecting male members.

Preferably, at the rotational locking step (b), it is then possible to radially push the softened thermoplastic material in said notch 13 so as to form at least one lug 14 which forms a male member 11 projecting radially with respect to the hub 5 and which slidably bears against said bearing surfaces 10A, 10B, so as to be blocked in rotation about the central axis (XX') but free to slide axially (herein at least in the extraction direction D2) along the central axis (XX'), as shown in particular in FIG. 7.

For convenience of the description, it is possible to assimilate the male member 11 and the lug(s) 14 in what follows.

Advantageously, the lug(s) 14 thus form radial bridges between the hub and the wall 2, projecting radially with respect to the thread 5T, and which secure the plug 4 and the wall 2 in rotation by some kind of keying.

The use of notches 13 having bearing surfaces 10A, 10B substantially parallel to the central axis (XX'), and preferably notches 13 that are axially open onto the visible external face of the wall 2, in the extraction direction D2, simplifies in particular the manufacture of the female cavities, since all it needs is to groove, or hollow molding, for example according to cross-brace layout centered on the central axis (XX'), the apparent surface of the wall 2, or, more particularly, the outer edge of the cylindrical jacket defined by said wall 2.

In this respect, it should be noted that a manufacture of the notches 13 by machining (grooving) allows obtaining bearing surfaces 10A, 10B that are exactly parallel to the central axis (XX'), whereas a manufacture by molding will require a slight draft angle, typically smaller than or equal to 5 degrees, preferably 3 degrees, or 2 degrees as indicated hereinabove.

Advantageously, such an arrangement of the bearing surfaces 10A, 10B, planar and (substantially) parallel to the central axis (XX'), enables said bearing surfaces to oppose a proper resistance, according to an orthoradial force component, to the screwing or unscrewing torque of the plug 4.

Preferably, and as shown in FIG. 7, the female cavity 10 includes a plurality of distinct notches 13, distributed around the central axis (XX'), and preferably evenly distributed around the central axis (XX').

Preferably, at the rotational locking step (b), a plurality of distinct male lugs 14 are simultaneously formed, each penetrating into one of said notches 13 and each cooperating by slidably bearing against the bearing surfaces 10A, 10B of their respective notch 13.

The number and the angular distribution of the rotational locking sets (lug 14/notch 13 sets) allows in particular adjusting, and in particular increasing, the resistance to screwing/unscrewing, but also balancing the rotational blocking forces, by offering a corrugation-type pairing between the wall 2 and the plug 4, while keeping relatively thin lugs.

Furthermore, such a distribution simplifies the manufacture of the lugs 14, and enables a reuse of the plug 4 should it turn out to be necessary to subsequently modify the calibration position P0, as will be explained hereinbelow.

Preferably, it will be provided for three or four notches 13, and as many lugs 14, preferably evenly distributed around the central axis (XX').

Preferably, at the rotational locking step (b), a forming tool 20 which is split, around the central axis (XX'), into as many arms 21 as there are male lugs 14 to be made, each arm 21 covering an angular sector which corresponds to the notch 23 that is assigned to said arm 21 (and therefore to the concerned lug 14), is applied against the plug 4, to soften and then push the thermoplastic material.

Advantageously, the use of an angularly split tool allows targeting the heat-up accurately, and thus thermoplastically deform the plug 4 only in the areas that are necessary and sufficient to make the lugs 14.

The use of multiple arms 21 advantageously allows making all the lugs 14 simultaneously, in one single step.

Furthermore, the number and the distribution, preferably equal, of the arms 21 around the central axis (XX') confer to the tool 20 an excellent stability and a high mechanical resistance when applying the insertion force F1.

Figure 1:
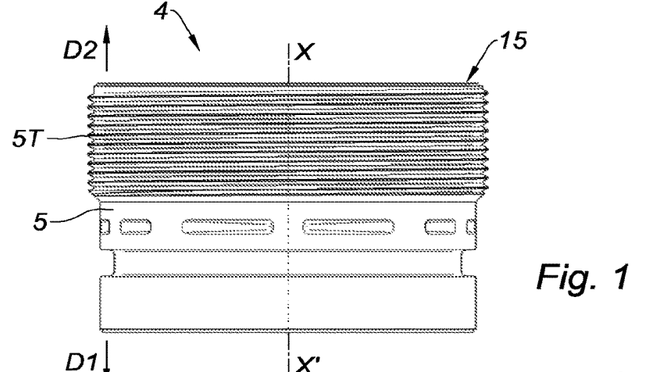
FIGS. 1, 2 and 3 illustrate, respectively according to side, top and perspective views, an example of a plug intended to be fastened by a method according to the invention.
Figure 2:
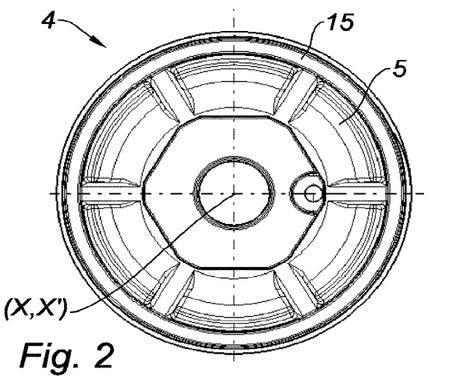
Figure 3:
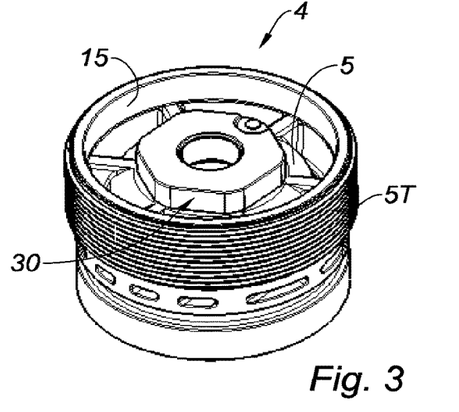
Figure 4:
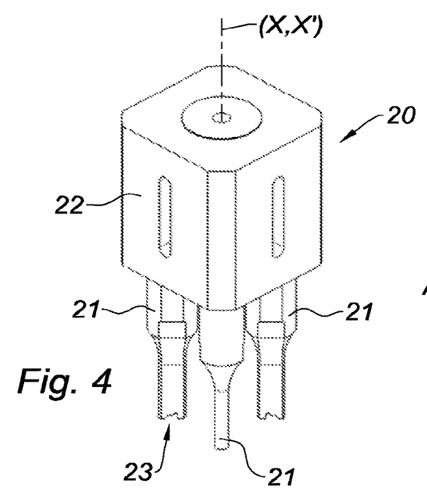
FIG. 4 illustrates, according to a perspective view, an example of a forming tool with four arms, such as a sonotrode, intended to shape the male members.

As illustrated in FIG. 4, the (preferably three or four) arms 21 are in the form of rigid pins, preferably metallic, born by the same tool body 22.

According to a preferred feature which may constitute an invention on its own, the hub 5 of the plug 4 has a peripheral crown 15 made of a thermoplastic material, which forms a hollow cylinder centered on the central axis (XX') and which has a radially outer face 15E which carries at least partially the thread of the hub 5T, as well as a radially inner face 15I which is (and remains) accessible from the outside when the hub 5 is screwed into the orifice 1.

Preferably, at the rotational locking step (b), it is then possible to partially soften the crown 15, in each area angularly located with respect to one notch 13, and then, in each area thus softened, push the thermoplastic material constitutive of the crown at least according to a centrifugal radial direction so as to make said softened thermoplastic material penetrate into the notch 13 corresponding thereto, and thus constitute a male lug 14 integrally with the crown 15 (and therefore more generally integrally with the hub 5), as illustrated in FIGS. 6, 7, 11, 12, 13, 16 and 19.

Such a crown 15 facilitates the manufacture of the lugs 14, in particular by the fact that, because its relatively fine radial thickness, said crown 15 needs a small amount of heat to be locally deformed by the tool 20, while having a proper rigidity, and therefore a proper resistance to deformation, in the other angular sectors, not targeted by the heat-up.

Furthermore, as will be detailed hereinbelow, it is advantageously possible to proceed with the thermoplastic deformation applying the arms 21 of the tool 20 on the apparent edge 15A of said crown 15, and thus, thanks to an adapted geometry of the arms 21, finely orientate the heat-up as well as the thrust exerted on the thermoplastic material.

Figure 11:
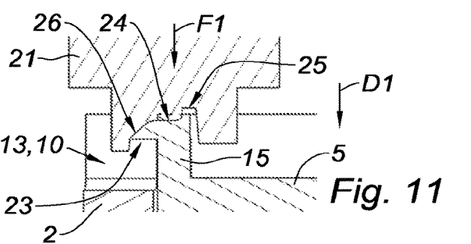
FIGS. 11, 12, and 13 illustrate, according to partial longitudinal sectional views, the progressive insertion of the tool against the plug, and the corresponding progressive formation of the male members projecting radially from the crown of said plug.
Figure 12:
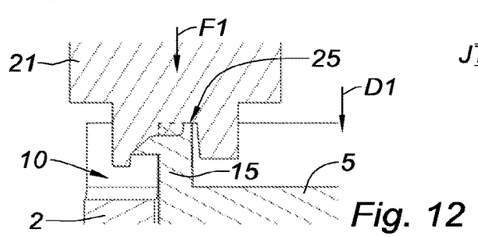
Figure 13:
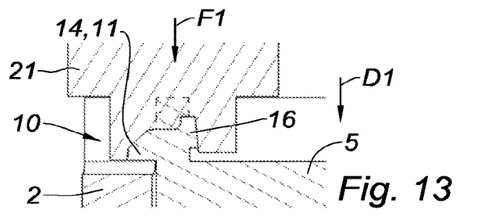

Preferably, each arm 21 has one end which is intended to come into contact with the edge 15A of the crown 15 and to be inserted into said crown 15 according to an axial penetration movement, herein according to the insertion direction D1, and which is illustrated in particular by the sequence of FIGS. 11, 12 and 13, so as to progressively push the softened thermoplastic material into the female cavity 10.

For convenience of the description, it is possible to assimilate the penetration movement and the insertion direction D1.

Figure 5:
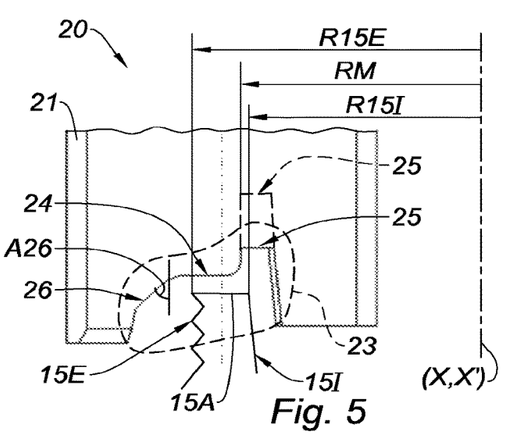
FIG. 5 is a detail view of the end imprint of the arms of the tool of FIG. 3.

As illustrated in FIGS. 5 and 7, the edge 15A of the crown 15 extends radially between an inner radius R15I, corresponding to the radially inner face 15I of the crown, and a radially outer radius R15E corresponding to the radially outer face 15E of said crown.

Preferably, the considered end of the arm 21 has an imprint 23 which comprises, in a section in a longitudinal sectional plane containing the central axis (XX'), and shown in FIG. 5, at least one first flange 24 and an inclined deflector 26, and possibly a second flange 25, as defined hereinafter.

The first flange 24 is arranged to be the first to bear, when the forming tool 20 is brought to contact with the plug 4, according to the insertion direction D1, against a radially outer portion of the edge 15A of the crown.

As illustrated in FIG. 5, said first flange 24 extends to this end, in a centrifugal radial manner (that is to say if we consider progressing along said first flange 24 by getting away from the central axis (XX')), from an intermediate radius RM strictly comprised between the inner radius R15I and the outer radius R15E up to, or beyond, the outer radius R15E of said crown, in order to initially concentrate, at a first step illustrated in FIG. 11, the energy supply outwardly and thus promote the softening and the centrifugal radial migration of the thermoplastic material.

By «centrifugal radial migration», it should be understood a substantially radial movement of the softened thermoplastic material in a direction which tends to move said material away from the central axis (XX'), to operate a radial transfer of said material outwardly from the hub 5.

According to a possible arrangement, it is possible to provide for a second flange 25 which is placed axially setback from the first flange 24 with respect to the direction D1 of the penetration movement, and which radially covers a radially inner portion of the edge 15A of the crown, forming the complementary portion of the radially outer portion of said edge 15A of the crown.

To this end, said second flange 25 extends in the centripetal radial direction from the intermediate radius RM up to, or beyond, the inner radius R15I of said crown (that is to say as close, or closer, to the central axis (XX') as the inner face 15I of the crown).

According to a first implementation variant, the second flange 25 is thus arranged so as to come into contact with the crown 15 after the first flange 24 has started penetrating axially into, and plastically deforming, the radially outer portion of said crown, so as to participate in a second place, illustrated in FIGS. 12 and 13, to the plastic deformation of the crown.

Thus, the staggered arrangement of the first and second flanges 24, 25 advantageously allows favoring a progressive backflow movement of the thermoplastic material outwardly from the crown 15 in two steps, by starting by the outer flange and then by continuing with the inner flange, which allows directing the material mainly in projection from the hub 5, where it participates to the formation of the useful lug 14, and thus limit the formation of a lost matter chip 15 on the inner face 15I of the crown 15.

Figure 18:
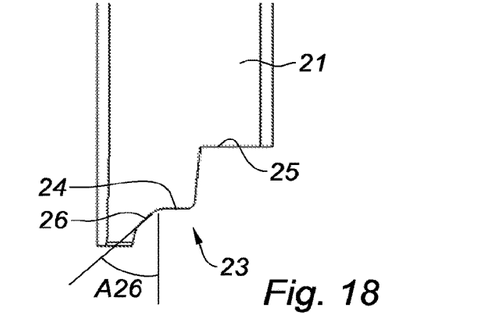
FIG. 18 illustrates, according to a partial side view, the detail of a variant of a forming tool imprint according to the invention.
Figure 19:
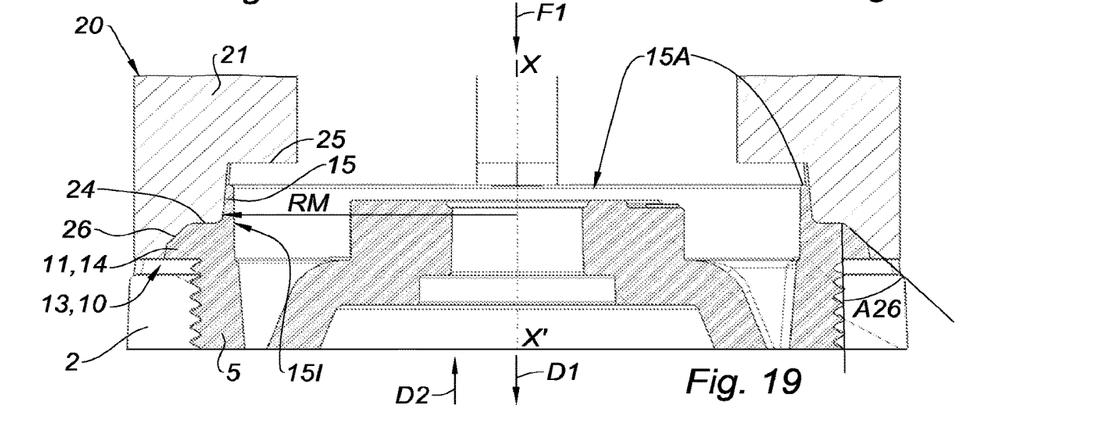
FIG. 19 illustrates, according to a partial longitudinal sectional view, the shaping, by means of the tool of FIG. 18, of male members projecting exclusively radially outwards from the hub of the plug.

According to a second implementation variant, as illustrated in dotted line in FIG. 5, or else in FIGS. 18 and 19, the second flange 25 may be located axially setback at a distance sufficient for not coming into contact with the crown 15 during the shaping of the lug(s) 14.

To this end, the axial distance separating the first flange 24 from the second flange 25 will be larger than the (predetermined) axial stroke of the forming tool 20 that is necessary for the formation of the lug(s) 14.

Thus, we avoid touching with the arm 21 of the tool 20 the radially inner portion of the edge 15A of the crown, and therefore we thus avoid heating and deforming the thermoplastic material in this area.

In this manner, we only form "emerging" lugs 14, useful to rotational blocking, but not "re-entering" lost matter chips 16 on the inner face of the crown 15, which allows improving the final aesthetical aspect of the casing plugged by the plug 4.

More particularly, and as illustrated in FIG. 19, it is possible to use the radially inner portion of the crown 15, not affected by the thermoplastic shaping, as a support barrier preventing the centripetal radial penetration of the softened material into the inner recessed portion of the hub 5, which will allow preserving a smooth and regular burr-free finish, corresponding to the original cylindrical inner surface 15I of the crown 15.

Moreover, whether there is provided for a second flange 25 or not, and whether this second flange 25 is arranged to bear against the edge 15A of the crown 15 or not, the imprint 23 will preferably comprise an (outer) inclined deflector 26.

The inclined deflector 26, which extends the first flange 24 both radially, in the centrifugal radial direction, and axially in the direction of the penetration movement D1, forms a draft (slope) A26 with respect to the central axis (XX').

Thus, the inclined deflector 26 can, during the axial insertion of the tool 20 into the crown 15, guide radially outwards and compact the softened thermoplastic material in order to form the projecting lug 14 on the radially outer face 15E of the crown 15.

Of course, the radial width of the imprint 23, that is to say the radial extent of the recessed opening delimited by the imprint 23 at the end of the arm 21, and more particularly the cumulated radial extent of the first flange 24 and of the second flange 25 will be larger than the radial thickness R15E-R15I of the crown 15, so as to enable the imprint 23 to completely cover and span over the crown, and thus effectively guide the softened material.

In particular, it is possible to provide for a radial width of the imprint 23, and more particularly a cumulated radial width of the first and second flanges 24, 25, which is strictly larger than the radial thickness of the edge 15A of the crown by a predefined value, corresponding to a radial clearance enabling the imprint 23, and more particularly the first and second flanges 24, 25, to accommodate possible radial tolerances of manufacture of the plug 24 and/or of positioning of the tool 20, and therefore of the arm 21, with respect to the plug 24 and the crown 15.

It should be noted that, advantageously, in the variant of FIGS. 18 and 19, the direct radial opening of the second flange 25 (and therefore of the imprint 23) onto the interior of the tool 20 (that is to say in the direction of the central axis (XX')), axially setback from the first flange 24 and the edge 15A of the crown 15, guarantees the absence of any interference between the forming tool 20 and the radially inner surface 15I of said crown 15.

Preferably, the first flange 24 and the second flange 25 will be perpendicular to the central axis (XX'), and more particularly perpendicular to the normal to the surface of the plug 4, herein perpendicular to the normal to the upper edge 15A of the crown 15, with which the forming tool 20 comes into contact.

Advantageously, such a perpendicular arrangement will allow in particular applying more effectively the heat-up energy to the plug 4, in particular if said energy is conveyed by hammering the surface of the plug by means of an ultrasonic forming tool 20.

Preferably, the edges forming the radial limits of the imprint 23 will have a draft with respect to the central axis (XX'), for example in the range of 1 degree to 5 degrees, or more, to promote the removal of the tool 20 after thermoforming of the lugs 14, without any risk of deforming or tearing off said lugs 14.

More generally, the imprint 23 will have, with respect to the crown 15 and the lugs 14, a shape which can be demolded according to the central axis (XX').

Preferably, the angular coverage A14 of each lug 14, in azimuth around the central axis (XX'), and considered at the base of said lug 14 at the radial limit between the plug 4 and the notch 13, is smaller than or equal to 30 degrees, and preferably comprised between 10 degrees and 20 degrees, for example substantially equal to 15 degrees.

In a complementary or equivalent manner, it is possible to consider that the lugs 14, and more particularly the notches 13, have arc lengths, considered at the radial limit between the plug 4 and the notch 13, which are smaller than or equal to 10 mm, and for example comprised between 5 mm and 7 mm, in particular for a hub radius typically comprised between 35 mm and 45 mm, for example for an M40 sized threaded hub 5.

Moreover, it should be noted that each notch 13 will be larger, in the orthoradial direction with respect to the central axis (XX'), than the end of the corresponding arm 21 of the forming tool 20, so as to provide for an orthoradial insertion clearance, preferably in the range of 1 mm to 2 mm, which enables the forming tool 20 to shape the lugs 14 without interfering with the casing 3.

Advantageously, by restricting the extent of each lug 14, the amount of energy required for the thermoforming is reduced.

Furthermore, this small extent promotes the miniaturization of the arms 21 of the tool, and therefore facilitates access to the plug 4 at the rotational locking step (a).

Finally, this limitation of the extent of the lugs 14, and therefore of their resistance to the shearing moments, allows defining a breaking point conferring to the lugs 14 a breakable nature, which allows, where required, readjusting the screwing (or unscrewing) of the plug 4 subsequently.

Thus, according to a possible variant of the invention, which may constitute an invention on its own, the method comprises, after at least one screwing step (a) and a rotational locking step (b), a forced unlocking step (c), during which a manipulating member 30 provided on the plug 4, such as a male or female hexagonal recess imprint formed on the hub, is engaged, and the rotation of the hub about the central axis (XX') is forced by breaking the male member, and then a setting step (d), during which the hub 5 is screwed or unscrewed in order to modify its axial position with respect to the orifice 1, and then a new rotational locking step (b') during which are formed, by softening and by pushing into the female cavity 10, 13, a new portion made of a thermoplastic material of the same plug 4, a new male member 11', 14' which is angularly shifted with respect to the original male member 11 (destroyed beforehand), in order to block the hub 5 in rotation about the central axis (XX') while keeping a degree of freedom in axial translation relative to said central axis (XX').

In other words, the invention allows providing for breakable lugs 14, which resist the unscrewing/screwing under normal conditions of use, and in particular in case of vibrations affecting the vehicle, but which may be destroyed by forcing the rotation of the plug 4 by means of a tool, such as a key, with which a maneuvering torque higher than a predetermined threshold torque is exerted.

The new locking step (b') corresponds in all respects to the locking step (b) described hereinabove, which is simply repeated, after having broken and eliminated the first set of lugs 14, to recreate, with respect to the same notches 13, a new set of lugs 14', shifted angularly with respect to the first set 14, on the same crown 15 of the same plug 4, which advantageously may thus be reused.

Thus, it is in particular possible to correct the calibration position P0 if the first setting is defective, or to subsequently compensate for the wear of the tappet 8.

It should be noted that the use of the sign 'after the reference numerals simply aims at distinguishing two elements, herein two lugs 14, 14', of the same nature by made at distinct locking steps (b), (b').

Of course, the manipulating member 30 may be formed by any appropriate imprint, whether male or female, and in particular by any polygonal imprint, for example square, hexagonal (six facets), corrugated, star-shaped, etc.

According to a possible implementation of the invention, the heat-up necessary for softening the thermoplastic material may be obtained by blowing hot air on the concerned portion(s) of the plug 4.

Once the thermoplastic material is softened, said material may be shaped by one or more arm(s) 21 of the tool (20) as mentioned hereinabove.

Advantageously, such a hot air blowing technique allows obtaining particularly solid lugs 14, having a very good resistance to screwing/unscrewing.

Nonetheless, according to a preferred possible implementation, an ultrasonic apparatus, called «sonotrode», is used as a forming tool 20 to soften by heat-up a portion of the plug 4 made of a thermoplastic material and then to push the softened thermoplastic material into the female cavity 10.

Advantageously, the arms 21 will then serve as vibratory elements, which will be brought to hammer the crown 15 of the hub 5.

Advantageously, such an ultrasonic forming technique allows reducing to about 6 seconds the cycle time, compared to the 20 seconds necessary for the hot air blowing technique.

In a particularly preferred manner, the frequency of the sonotrode is higher than 20 kHz, preferably higher than 30 kHz, and preferably equal to 35 kHz.

Advantageously, this selection of frequencies allows localizing the heat-up, and avoiding in particular an accidental welding of the plug 4 to the pad 12 of the tappet 8, or a degradation of the damper O-ring gasket 31 which is provided between the pad 12 of the tappet 8 and the hub 5 of the plug.

It should also be noted that the frequency of the sonotrode 20 will preferably be selected such that the total axial force exerted by the sonotrode 20 against the plug 4, in the insertion direction D1, such that said force results from the mechanical application (that is to say from the holding and progressive axial insertion) of the sonotrode against said plug 4 and from the hammering caused by the ultrasounds, remains lower than the biasing force F2 exerted by the elastic member (herein formed by the spring 9 and damper O-ring gasket 31 set), so as to avoid locally and accidently weld the plug 4 to the pad 12, when said pad 12 is also made of a plastic material.

Of course, the invention concerns as such a power steering system 6 comprising at least one mechanism housed within a steering casing 3 which is plugged by a plug 1 in accordance with a method according to any one of the variants of implementation of the invention.

Finally, the invention concerns an ultrasonic forming tool 20 intended to lock in rotation a plug 4 screwed beforehand into an orifice 1, said forming tool 20 comprising a body 22 which extends according to a central axis (XX') and which carries a plurality of distinct arms 21, distributed around the axis (XX'), said arms 21 being arranged to transmit ultrasonic waves to the plug 4, at the level of the periphery of said plug, in order to be able to locally heat up and soften, in a simultaneous manner, different peripheral portions of the plug 4, located in distinct angular sectors around the central axis (XX') and made of a thermoplastic material, and in order to be able to push, according to at least one centrifugal radial direction, the thermoplastic material softened in this manner in each concerned angular sector, when the tool 20 is pressed axially against the plug 4 to exert an insertion stress F1, so as to radially project on said plug 4, in said angular sector, a lug 14 which fits into a corresponding notch 13 provided in a wall 2 of the orifice 1, according to an arrangement such that the lug 14 rotatably abuts against the bearing surfaces 10A, 10B delimiting said notch 13 while keeping a freedom to axially slide against said bearing surfaces 10A, 10B.

Of course, the invention is in no way limited to the aforementioned variants, those skilled in the art being able in particular to freely isolate or combine together any of the features described in the foregoing or substitute them with equivalents.

The invention claimed is:

1. A plugging method allowing plugging an orifice with a central axis pierced in a wall by means of a plug having a threaded hub provided with at least one thread, the method comprising a screwing step during which the threaded hub of the plug is screwed into the orifice by fitting the thread of the hub against the wall, then a rotational locking step, during which the rotation of the threaded hub about the central axis is blocked in order to resist the screwing and unscrewing of the plug, wherein, at the rotational locking step, a portion of the plug made of a thermoplastic material is heated up so as to soften the thermoplastic material, the softened thermoplastic material is forced to penetrate, and then to solidify, into a female cavity drilled in the wall of the orifice in order to constitute a male lug which nests into the female cavity, the female cavity being arranged such that it forms against the male lug a guide stop which, on the one hand, prevents the rotation of the male lug, and therefore of the hub, about the central axis, so as to resist a screwing or unscrewing rotational movement of the plug, and which on the other hand keeps a degree of freedom in axial translation, along the central axis, of the male lug within the female cavity, so as not to hinder a sliding of the hub and of the thread along the central axis, against the wall, in that there is provided, in the wall, the female cavity formed by at least one notch which opens onto the orifice and which is delimited in azimuth around the central axis by surfaces, called bearing surfaces, which are substantially parallel to the central axis, and in that, at the rotational locking step, the softened thermoplastic material is pushed radially into the notch so as to form the male lug projecting radially with respect to the hub and which slidably bears against the bearing surface, so as to be blocked in rotation about the central axis but free to axially slide along the central axis, wherein the male lug includes a radially outermost edge, relative to the central axis, that protrudes further than a radially innermost edge of the male lug in an axial direction of the central axis.

2. The plugging method according to claim 1, wherein, at the screwing step, the threaded hub is screwed into the orifice in a direction called «penetration direction», against an elastic member which exerts on the hub a biasing force oriented in an opposite direction, called «extraction direction», such that the elastic member tends to urge the thread of the hub so as to bear at the rear against the wall, and the screwing is continued until the hub reaches a desired axial position, called «calibration position», in which the thread of the hub is pressed so as to bear at the rear against the wall by the elastic member, in that, at the rotational locking step, a forming tool which exerts an insertion force in the penetration direction is applied on the plug, to soften and push the thermoplastic material into the female cavity, the insertion force thus tending to peel off the thread of the hub from a back bearing of the hub, and to displace the plug in the penetration direction relative to the calibration position, and then in that, once the male lug is formed, the forming tool is removed so as to release the insertion force and to enable the hub and the male lug to perform, under the action of the elastic member, a return movement in the extraction direction, until the plug recovers the calibration position, with the thread of the hub pressed so as to bear at the rear against the wall.

3. The plugging method according to claim 1, wherein the female cavity includes a plurality of distinct notches, distributed around the central axis, and in that, at the rotational locking step, there are simultaneously formed a plurality of distinct male lugs, each penetrating into one of the notches and each cooperating by sliding bearing against the bearing surfaces of the respective notch.

4. The plugging method according to claim 3, during which, at the rotational locking step, a forming tool which is split, around the central axis, into as many aims as there are male lugs to be made, each arm covering an angular sector which corresponds to the notch that is assigned to the arm, is applied against the plug, to soften and then push the thermoplastic material.

5. The plugging method according to claim 1, wherein the hub of the plug has a peripheral crown made of a thermoplastic material, which forms a hollow cylinder centered on the central axis and which has a radially outer face which carries at least partially the thread of the hub, as well as a radially inner face which is accessible from the outside when the hub is screwed into the orifice, and in that, at the rotational locking step, the crown is partially softened, in each area located angularly with respect to a notch, and then, in each area thus softened, the thermoplastic material constitutive of the crown is pushed at least according to a centrifugal radial direction to make the softened thermoplastic material penetrate into the notch corresponding thereto, and thus constitute the male lug integral with the crown.

6. The plugging method according to claim 5, wherein each arm has one end which comes into contact with an edge of the crown which extends radially between an inner radius, corresponding to the radially inner face of the crown, and a radially outer radius corresponding to the radially outer face of the crown, and to fit into the crown according to an axial penetration movement to progressively push the softened thermoplastic material into the female cavity, the end having an imprint which comprises, in a section in a longitudinal sectional plane containing the central axis,
- a first flange, arranged to be the first to bear against a radially outer portion of the edge of the crown, and which extends to this end in a centrifugal radial manner from an intermediate radius strictly comprised between the inner radius and the outer radius up to, or beyond, the outer radius of the crown, in order to initially concentrate the energy supply outwardly and thus promote the softening and the centrifugal radial migration of the thermoplastic material,
- an inclined deflector, which extends the first flange both radially, in the centrifugal radial direction, and axially in the direction of the penetration movement, and which forms a draft with respect to the central axis, so as to be able to guide radially outwards and compact the softened thermoplastic material in order to form the male lug on the radially outer face of the crown, during the axial insertion of the tool into the crown.

7. The plugging method according to claim 1, wherein the angular coverage of each male lug, in azimuth around the central axis, and considered at the base of said the male lug at the radial limit between the plug and the notch, is smaller than or equal to 30 degrees.

8. The plugging method according to claim 1, wherein it comprises a forced unlocking step, during which a manipulating member provided on the plug is engaged and the rotation of the hub about the central axis is forced by breaking the male lug, and then a setting step, during which the hub is screwed or unscrewed in order to modify an axial position of the hub with respect to the orifice, and then a new rotational locking step during which are formed, by softening and by pushing into the female cavity, a new portion made of a thermoplastic material of the same plug, a new male lug which is angularly shifted with respect to the original male lug, in order to block the hub in rotation about the central axis while keeping a degree of freedom in axial translation relative to the central axis.

9. The plugging method according to claim 1, wherein an ultrasonic apparatus, called «sonotrode», which has a frequency higher than 20 kHz, is used, as a forming tool to soften by heat-up a portion of the plug made of a thermoplastic material and then push the softened thermoplastic material into the female cavity.

10. A plugging method allowing plugging an orifice with a central axis pierced in a wall by means of a plug having a threaded hub provided with at least one thread, the method comprising a screwing step during which the threaded hub of the plug is screwed into the orifice by fitting the thread of the hub against the wall, then a rotational locking step, during which the rotation of the threaded hub about the central axis is blocked in order to resist the screwing and unscrewing of the plug, wherein, at the rotational locking step, a portion of the plug made of a thermoplastic material is heated up so as to soften the thermoplastic material, the softened thermoplastic material is forced to penetrate, and then to solidify, into a female cavity drilled in the wall of the orifice in order to constitute a male lug which nests into the female cavity, the female cavity being arranged such that it forms against the male lug a guide stop which, on the one hand, prevents the rotation of the male lug, and therefore of the hub, about the central axis, so as to resist a screwing or unscrewing rotational movement of the plug, and which on the other hand keeps a degree of freedom in axial translation, along the central axis, of the male lug within the female cavity, so as not to hinder a sliding of the hub and of the thread along the central axis, against the wall, in that there is provided, in the wall, the female cavity formed by at least one notch which opens onto the orifice and which is delimited in azimuth around the central axis by surfaces, called bearing surfaces, which are substantially parallel to the central axis, and in that, at the rotational locking step, the softened thermoplastic material is pushed radially into the notch so as to form the male lug projecting radially with respect to the hub and which slidably bears against the bearing surface, so as to be blocked in rotation about the central axis but free to axially slide along the central axis, wherein
- the female cavity includes a plurality of distinct notches, distributed around the central axis, and in that, at the rotational locking step, a forming tool simultaneously forms a plurality of distinct male lugs, each penetrating into one of the notches and each cooperating by sliding bearing against the bearing surfaces of the respective notch, and at the rotational locking step, the forming tool which is split, around the central axis, into as many arms as there are male lugs to be made, each arm covering an angular sector which corresponds to the notch that is assigned to the arm, is applied against the plug, to soften and then push the thermoplastic material, and
- a tip of each arm including an arm tip notch, and a radially outer edge of the arm tip notch extending further axially relative to the central axis than a radially inner edge of the arm tip notch.

* * * * *